US008838794B2

(12) United States Patent
Greenlee et al.

(10) Patent No.: US 8,838,794 B2
(45) Date of Patent: Sep. 16, 2014

(54) METHOD, SYSTEM AND PROGRAM PRODUCT FOR SIMULATING ACTIVITY IN A SERVER ENVIRONMENT

(75) Inventors: Gordan G. Greenlee, Endicott, NY (US); Kan Y. Hsiao, Towaco, NJ (US); Howard E. Poole, Poughkeepsie, NY (US); Joseph F. Riina, Wayne, NJ (US); Joe W. Simons, Superior, CO (US); Richard E. Weingarten, Erie, CO (US)

(73) Assignee: International Business Machines Corporation, Armonk, NY (US)

(*) Notice: Subject to any disclaimer, the term of this patent is extended or adjusted under 35 U.S.C. 154(b) by 2375 days.

(21) Appl. No.: 10/881,877

(22) Filed: Jun. 30, 2004

(65) Prior Publication Data

US 2006/0080450 A1    Apr. 13, 2006

(51) Int. Cl.
 G06F 15/173    (2006.01)
 G01R 35/00     (2006.01)
 G06F 9/46      (2006.01)
 H04L 29/12     (2006.01)
 H04L 12/26     (2006.01)

(52) U.S. Cl.
 CPC ............ H04L 29/12 (2013.01); H04L 61/1523 (2013.01); H04L 43/50 (2013.01); H04L 14/2697 (2013.01)
 USPC ............................ 709/226; 702/108; 718/105

(58) Field of Classification Search
 USPC ................................................ 709/221–226
 See application file for complete search history.

(56) References Cited

U.S. PATENT DOCUMENTS

| 5,440,697 | A | 8/1995 | Boegel et al. |
| 6,209,033 | B1 * | 3/2001 | Datta et al. .................... 709/224 |
| 6,301,615 | B1 * | 10/2001 | Kutcher ........................ 709/224 |
| 6,522,995 | B1 | 2/2003 | Conti et al. |
| 6,542,854 | B2 * | 4/2003 | Yang et al. .................... 702/186 |
| 6,574,587 | B2 * | 6/2003 | Waclawski .................... 702/186 |
| 6,587,874 | B1 * | 7/2003 | Golla et al. ................... 709/220 |
| 6,640,238 | B1 * | 10/2003 | Bowman-Amuah .......... 709/201 |
| 6,640,244 | B1 * | 10/2003 | Bowman-Amuah .......... 709/207 |
| 6,898,564 | B1 * | 5/2005 | Odhner et al. .................. 703/21 |
| 7,107,187 | B1 * | 9/2006 | Saghier et al. ................ 702/186 |
| 7,184,945 | B1 * | 2/2007 | Takahashi et al. ............. 703/22 |
| 7,313,635 | B1 * | 12/2007 | Zavalkovsky ................. 709/248 |
| 7,373,376 | B1 * | 5/2008 | Hamer et al. ................. 709/203 |
| 7,516,137 | B1 * | 4/2009 | Earle et al. ....................... 1/1 |
| 2001/0044792 | A1 * | 11/2001 | Kikuchi et al. ................... 707/3 |
| 2001/0054091 | A1 * | 12/2001 | Lenz et al. .................... 709/221 |
| 2002/0004773 | A1 * | 1/2002 | Xu et al. ........................ 705/36 |

(Continued)

OTHER PUBLICATIONS

IBM, "LDD Today", Williams et al., Sep. 2002, pp. 1-5.*

(Continued)

*Primary Examiner* — Ranodhi Serrao
(74) *Attorney, Agent, or Firm* — Lisa Ulrich; Hoffman Warnick LLC

(57) ABSTRACT

Under the present invention an audit log for the server environment is obtained and parsed to remove any extraneous information. The parsing operation will typically leave only the previous operations processed by the server environment in the audit log. Thereafter, the parsed audit log is fed back to the server environment. Specifically, each operation in the audit log is fed back to the server environment as a request. Each request will typically have its own thread to simulate concurrent thread activity in the server environment. After the requests have been fed, statistics corresponding to the resulting performance of the server environment will be generated.

17 Claims, 3 Drawing Sheets

(56) References Cited

U.S. PATENT DOCUMENTS

| | | | |
|---|---|---|---|
| 2002/0087282 A1* | 7/2002 | Millard | 702/108 |
| 2002/0087718 A1* | 7/2002 | Hill et al. | 709/237 |
| 2003/0036897 A1 | 2/2003 | Flores et al. | |
| 2005/0027858 A1* | 2/2005 | Sloth et al. | 709/224 |
| 2012/0111926 A1* | 5/2012 | Wolstenholme | 228/200 |

OTHER PUBLICATIONS

"Installation Guide and Tools Reference," Version 5.1, Apr. 2002, pp. 241-246.*

Wahl, "Lightweight Directory Access Protocol", Dec. 1997, Network Working Group Request for Comments: 2251.*

* cited by examiner

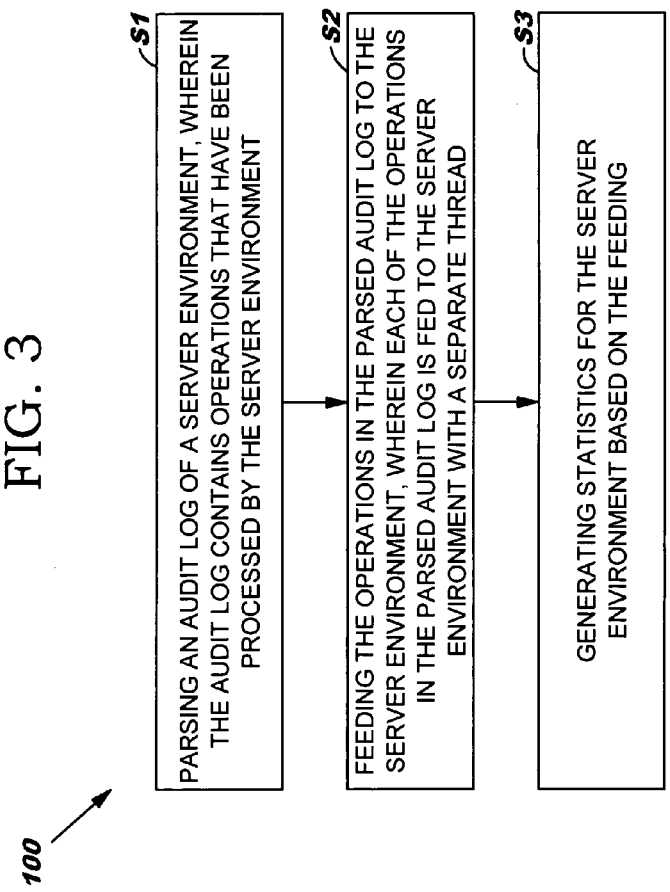

METHOD, SYSTEM AND PROGRAM PRODUCT FOR SIMULATING ACTIVITY IN A SERVER ENVIRONMENT

FIELD OF THE INVENTION

In general, the present invention provides a method, system and program product for simulating activity in a server environment. Specifically, the present invention provides a way to simulate a realistic load against set of Lightweight Directory Access Protocol (LDAP) servers or the like, and to analyze the resulting performance thereof.

BACKGROUND OF THE INVENTION

In many server environments such as an LDAP environment, it is often difficult to perform capacity planning to determine hardware benchmarks and analyze overall performance. For example, projecting the needs of a multi-server LDAP environment can be very time consuming and difficult to determine. This is especially the case since traffic from exploiting applications and end users can vary from simple queries to extremely lengthy and complex search filters. Typical operations that are commonly performed against an LDAP environment include searches, additions, deletions, and modifications.

Currently, no existing technology provides a way to simulate a realistic load against a server environment and analyze the resulting performance thereof. That is, no existing solution has been provided that allows testers to drive previously experienced loads against a server environment and then analyze the resulting performance. The capability to drive such a load would be invaluable because it would provide realistic benchmarks and performance evaluation. Moreover, no existing system provides a way to simulate concurrent (multiple) thread activity against the server environment.

In view of the foregoing, there exists a need for a method, system and program product for simulating activity in a server environment. Specifically, a need exists for a way to drive a realistic load against a server environment, and measure the results. Still yet, a need exists for a way to simulate concurrent thread activity in the server environment.

SUMMARY OF THE INVENTION

In general, the present invention provides a method, system and program product for simulating activity in a server environment such as an LDAP environment. Specifically, under the present invention an audit log for the server environment is obtained and parsed to remove any extraneous information. The parsing operation will typically leave only the previous operations processed by the server environment in the audit log. Thereafter, the parsed audit log is fed back to the server environment. Specifically, each operation in the audit log is fed back to the server environment as a request. Each request will typically have its own thread to simulate concurrent thread activity in the server environment. After the requests have been fed, statistics corresponding to the resulting performance of the server environment will be generated.

A first aspect of the present invention provides a method for simulating activity in a server environment, comprising: parsing an audit log of the server environment, wherein the audit log contains operations that have been processed by the server environment; feeding the operations in the parsed audit log to the server environment, wherein each of the operations in the parsed audit log is fed to the server environment with a separate thread to simulate concurrent thread activity; and generating statistics for the server environment in response to the feeding.

A second aspect of the present invention provides a method for simulating activity in a Lightweight Directory Access Protocol (LDAP) environment, comprising: parsing an audit log of the LDAP environment, wherein the audit log contains operations that have been processed by the LDAP environment; feeding the operations in the parsed audit log to the LDAP environment as requests, wherein each of the requests are fed to the LDAP environment with a separate thread to simulate concurrent thread activity; and generating statistics for the LDAP environment in response to the feeding.

A third aspect of the present invention provides a system for simulating activity in a server environment, comprising: a log scrubber for parsing an audit log of the server environment, wherein the audit log contains operations that have been processed by the server environment; an exploiter simulator for feeding the operations in the parsed audit log to the server environment, wherein each of the operations in the parsed audit log is fed to the server environment with a separate thread to simulate concurrent thread activity; and a log analyzer for generating statistics for the server environment in response to the feeding.

A fourth aspect of the present invention provides a program product stored on a recordable medium for simulating activity in a server environment, which when executed, comprises: program code for parsing an audit log of the server environment, wherein the audit log contains operations that have been processed by the server environment; program code for feeding the operations in the parsed audit log to the server environment, wherein each of the operations in the parsed audit log is fed to the server environment with a separate thread to simulate concurrent thread activity; and program code for generating statistics for the server environment in response to the feeding.

A fifth aspect of the present invention provides a system for deploying an application for simulating activity in a server environment, comprising: a computer infrastructure being operable to: parse an audit log of the server environment, wherein the audit log contains operations that have been processed by the server environment; feed the operations in the parsed audit log to the server environment, wherein each of the operations in the parsed audit log is fed to the server environment with a separate thread to simulate concurrent thread activity; and generate statistics for the server environment in response to the feeding.

A sixth aspect of the present invention provides computer software embodied in a propagated signal for simulating activity in a server environment, the computer software comprising instructions to cause a computer system to perform the following functions: parse an audit log of the server environment, wherein the audit log contains operations that have been processed by the server environment; feed the operations in the parsed audit log to the server environment, wherein each of the operations in the parsed audit log is fed to the server environment with a separate thread to simulate concurrent thread activity; and generate statistics for the server environment in response to the feeding.

Therefore, the present invention provides a method, system and program product for simulating activity in a server environment such as an LDAP environment.

BRIEF DESCRIPTION OF THE DRAWINGS

These and other features of this invention will be more readily understood from the following detailed description of the various aspects of the invention taken in conjunction with the accompanying drawings in which:

FIG. 3 depicts a method flow diagram according to the present invention.

Figure 1:
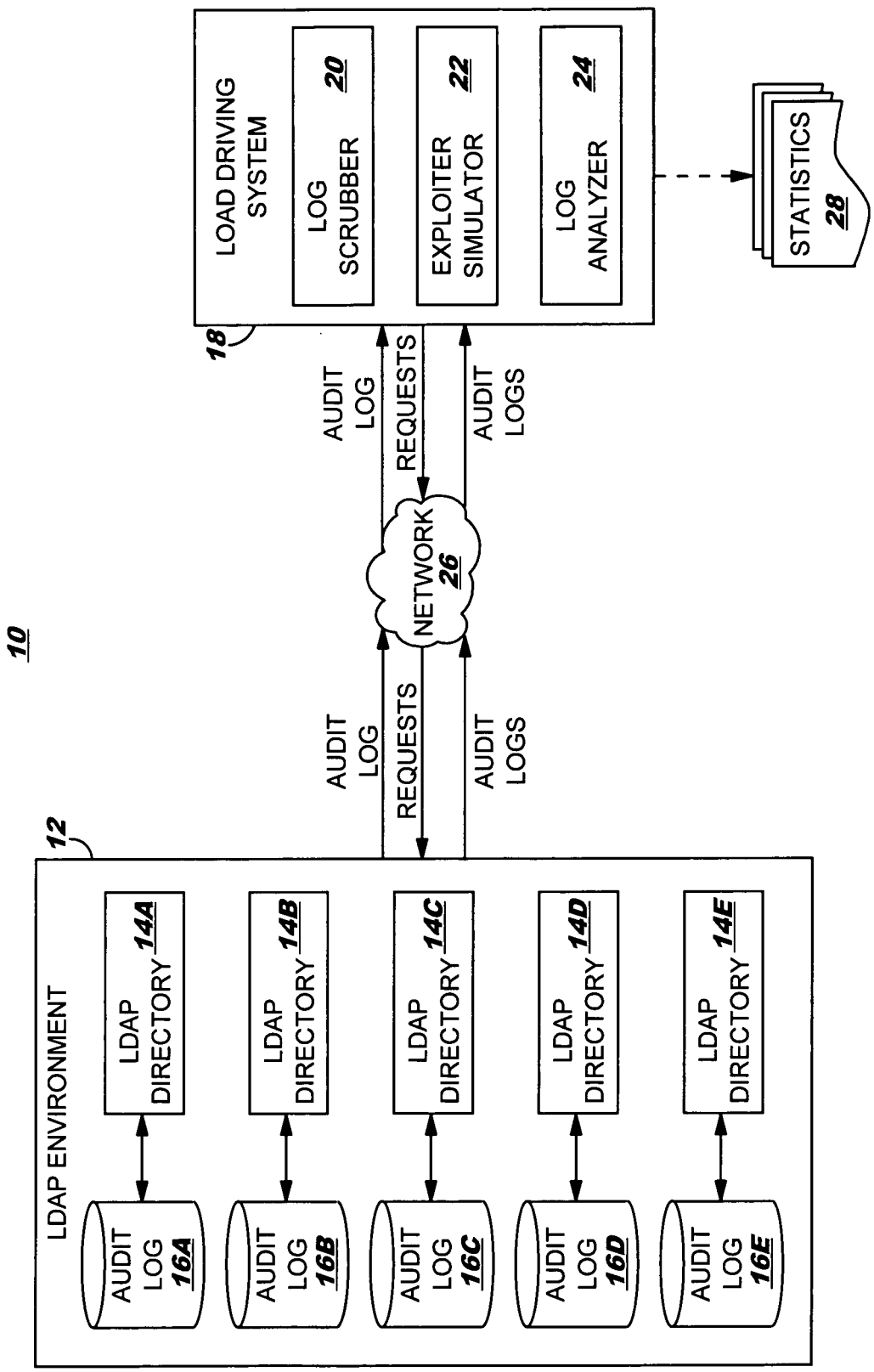
FIG. 1 depicts a system for simulating activity in a server environment according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

BEST MODE FOR CARRYING OUT THE INVENTION

For convenience purposes, the Best Mode for Carrying Out the Invention will have the following sections:
I. General Description
II. Computerized Implementation
I. General Description As indicated above, the present invention provides a method, system and program product for simulating activity in a server environment such as an LDAP environment. Specifically, under the present invention an audit log for the server environment is obtained and parsed to remove any extraneous information. The parsing operation will typically leave only the previous operations processed by the server environment in the audit log. Thereafter, the parsed audit log is fed back to the server environment. Specifically, each operation in the audit log is fed back to the server environment as a request. Each request will typically have its own thread to simulate concurrent thread activity in the server environment. After the requests have been fed, statistics corresponding to the resulting performance of the server environment will be generated. It should be understood that although teachings of the present invention will be described in conjunction with an LDAP environment, they could be practiced in conjunction with any type of server environment. In addition, it should be understood that the teachings of the present invention could be practiced in conjunction with a server environment having any quantity (e.g., one or more) of servers.

Referring now to FIG. 1, an illustrative system 10 for simulating activity in a server environment 12 is shown. As depicted, server environment 12 is an LDAP environment that includes LDAP replicas/servers 14A-N. As further shown, each LDAP replica 14A-N has a corresponding audit log 16A-N. In general, audit logs 16A-N contain a record of (LDAP) operations (from clients or the like) that have been previously processed by LDAP replicas 14A-N. For example, audit log 16A will contain LDAP operations that were processed by LDAP replica 14A. Such operations typically include, among others, LDAP searches, additions, deletions, modifications, etc.

Under the present invention, load driving system 18 will communicate with LDAP replicas 14A-N over network 26 to simulate a load against LDAP environment 12. It should be appreciated that communication is depicted with LDAP environment 12 as a whole instead of with individual LDAP replicas 14A-N. This depiction is made for simplicity purposes only, and it should be understood that communication could be held with the LDAP replicas 14A-N themselves. In addition, other components not shown (e.g., a network dispatcher) could be included within system 10. Such components have not been depicted for simplicity purposes.

In any event, the load is typically simulated against LDAP replicas 14A-N using one or more audit logs 16A-N as a "seed log." For example, assume that load driving system 18 selects a single audit log, namely, audit log 16A as the seed log. Under the present invention, log scrubber 20 will retrieve audit log 16A by communicating with LDAP replica 14A. Upon receipt, log scrubber 20 will parse audit log 16A and remove all extraneous information. Such information can include, among other things, control type, criticality, authentication choice, etc. The parsing operation will generally leave only the actual operations that were processed by LDAP replica 14A. Once the parsing has been completed, exploiter simulator 22 will feed the operations in the parsed audit log 16A back to one or more of the LDAP replicas 14A-N. That is, exploiter simulator will make/feed a "request" to LDAP replicas 14A-N for each of the operations contained in the parsed audit log 16A. In general, each bind request is made with a separate thread. Moreover, each operation/request is made with a separate thread so that concurrent (multiple) thread activity can be simulated in LDAP environment 12. Since an actual audit log was used to drive the load against LDAP replicas 14A-N, a realistic load is simulated.

In a typical embodiment, the requests will be feed directly to LDAP replicas 14A-N over network 26. However, this need not be the case. For example, exploiter simulator 22 could feed the requests to a "proxy" LDAP replica (e.g., through an optional network dispatcher) along with an instruction that indicates precisely which LDAP replica(s) 14A-N should receive the requests. The "proxy" LDAP replica would then reroute the received requests to the LDAP replicas identified in the instruction. In such a case, one of the LDAP replicas 14A-N could be designated as the "proxy." Alternatively, a dedicated "proxy" LDAP replica (not shown) separate from LDAP replicas 14A-N could be provided. In addition, in this illustrative example, the requests are fed to each LDAP replica 14A-N. However, it should be appreciated that the requests could be fed to only selected LDAP replicas 14A-N. For example, the requests could be fed to only LDAP replica 14B, to replicas 14A and 14C, etc.

In any event, once the requests are fed, the performance of LDAP environment 12 will be analyzed by log analyzer 24. Specifically, log analyzer 24 will retrieve the audit logs 16A-N from the LDAP replicas 14A-N to which the requests were fed. Using these audit logs 16A-N, log analyzer 14 will generate statistics 28 to evaluate the performance of LDAP replicas 14A-N. In a typical embodiment, statistics 28 are broken out into discrete LDAP operations that can be easily loaded into a spreadsheet for further analysis. Moreover, statistics 28 will typically include the following statistical data:

IP Analysis—a number of operations by IP address (e.g., of the clients), a number of operations per hour processed by the LDAP replicas 14A-N, response times of the LDAP replicas 14A-N, etc.

Filter Analysis—date/time of completion of the operations, client IP address, connection identification, date/time of receipt of the operations by the LDAP replicas 14A-N, success/failure of the LDAP replicas 14A-N to process the operations, etc.

Numeric Analysis—a number of search operations made, a number of modification operations made, a number of addition operations made, a number of deletion operations made, etc.

The statistics 28 can be provided in a single spreadsheet/file for all LDAP replicas 14A-N tested. Alternatively, separate spreadsheet/files could be provided for each LDAP replica 14A-N tested.

II. Computerized Implementation

Figure 2:
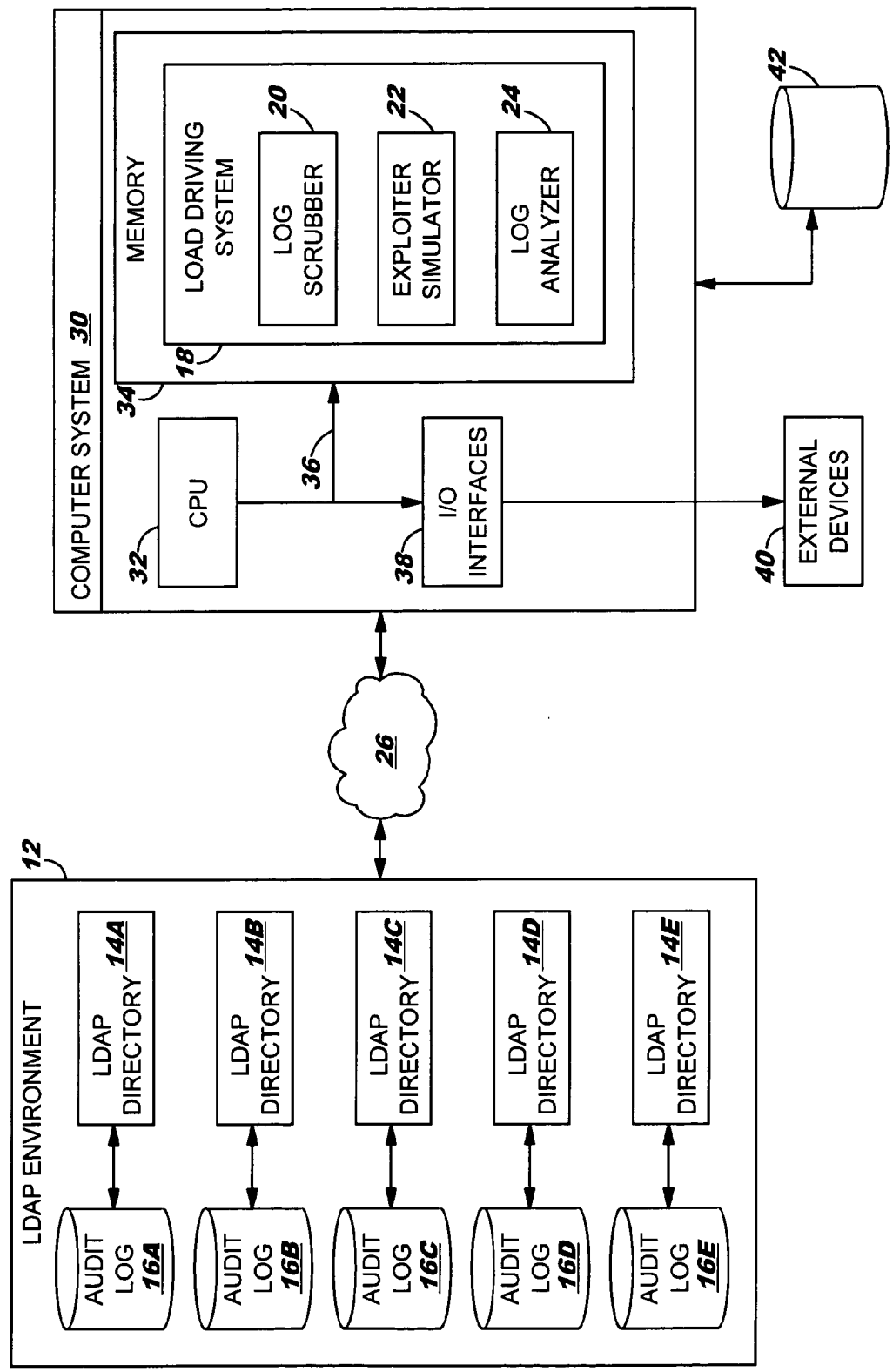
FIG. 2 depicts a computerized implementation of the system of FIG. 1.

Referring now to FIG. 2, load driving system 18 is represented as a program product on computer system 30. In general, computer system 30 is intended to represent any type of computer system that is capable of communicating with LDAP replicas 14A-N over a network 26. For example, computer system 30 could be a desktop, a laptop, a workstation. Moreover, computer system 30 could be a client or a server. In any event, computer system 30 typically communicates with LDAP environment (i.e., LDAP replicas 14A-N) over a network. Network 26 can be any type of network such as the Internet, a local area network (LAN), a wide area network (WAN), a virtual private network (VPN), etc. Communication between computer system 12 and LDAP replicas 14A-N could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication between computer system 30 and LDAP replicas 14A-N could occur in a client-server or server-server environment.

As further shown in FIG. 2, computer system 30 generally includes central processing unit (CPU) 32, memory 34, bus 36, input/output (I/O) interfaces 38, external devices/resources 40 and storage unit 42. CPU 32 may comprise a single processing unit, or be distributed across one or more processing units in one or more locations, e.g., on a client and server. Memory 34 may comprise any known type of data storage and/or transmission media, including magnetic media, optical media, random access memory (RAM), read-only memory (ROM), a data cache, a data object, etc. Moreover, similar to CPU 32, memory 34 may reside at a single physical location, comprising one or more types of data storage, or be distributed across a plurality of physical systems in various forms.

I/O interfaces 38 may comprise any system for exchanging information to/from an external source. External devices/resources 40 may comprise any known type of external device, including speakers, a CRT, LED screen, hand-held device, keyboard, mouse, voice recognition system, speech output system, printer, monitor/display, facsimile, pager, etc. Bus 36 provides a communication link between each of the components in computer system 30 and likewise may comprise any known type of transmission link, including electrical, optical, wireless, etc.

Storage unit 42 can be any system (e.g., a database, etc.) capable of providing storage for information under the present invention. Such information could include, for example, audit files, statistical data, etc. As such, storage unit 42 could include one or more storage devices, such as a magnetic disk drive or an optical disk drive. In another embodiment, storage unit 42 includes data distributed across, for example, a local area network (LAN), wide area network (WAN) or a storage area network (SAN) (not shown). Although not shown, additional components, such as cache memory, communication systems, system software, etc., may be incorporated into computer system 30. In addition, it should be appreciated that although not shown, LDAP replicas 14A-N could include computerized components similar to computer system 30.

Shown in memory 34 of computer system 30 is load driving system 18. As indicated above, load driving system 18 will simulate a load against LDAP replicas 14A-N using a parsed audit log as a "seed log." After the load is driven, the resulting performance of LDAP replicas 14A-N will be analyzed and statistics based thereon will be generated. Specifically, log scrubber 20 will first retrieve an audit log (e.g., audit log 16A) from LDAP environment 12. Thereafter, log scrubber 20 will parse the audit log and remove all extraneous information therein. Once parsed, the audit log will be fed back to the desired LDAP replicas 14A-N. That is, each operation contained in the parsed audit log will be fed back to LDAP replicas 14A-N as a separate request (i.e., with a separate thread) by exploiter simulator 22. Since the parsed audit log contains operations that were previously passed through LDAP environment 12, it provides a realistic load against LDAP environment 12. Once the requests have been fed, log analyzer 24 will retrieve the audit logs 16A-N for the LDAP replicas 14A-N that received the simulated load. Based on those audit logs 16A-N, statistics describing the resulting behavior of LDAP replicas 14A-N will be generated.

It should be appreciated that the teachings of the present invention could be offered as a business method on a subscription or fee basis. For example, computer system 30 could be created, maintained and/or deployed by a service provider that offers the functions described herein for customers. That is, a service provider could offer to test a server environment of a customer by driving a load and analyzing the resulting performance as describe above. It should also be understood that the present invention can be realized in hardware, software, a propagated signal, or any combination thereof. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product or a propagated signal, which comprises all the respective features enabling the implementation of the methods described herein, and which—when loaded in a computer system—is able to carry out these methods. Computer program, propagate signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

Referring now to FIG. 3, an illustrative method flow diagram 100 according to the present invention is shown. As depicted, first step S1 is to parse an audit log of a server environment, wherein the audit log contains operations that have been processed by the server environment. Second step S2 is to feed the operations in the parsed audit log to the server environment, wherein each of the operations in the parsed audit log is fed to the server environment with a separate thread to simulate concurrent thread activity. Third step S3 is to generate statistics for the server environment in response to the feeding.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, the configuration of load driving system 18 of FIGS. 1-2 is intended to be illustrative only. As such, load driving system 18 could be represented by a different configuration of systems.

We claim:

1. A method for simulating activity in a Lightweight Directory Access Protocol (LDAP) server environment, comprising:
    parsing, via a computer processor, an audit log of a server in the server environment, wherein the audit log contains operations that have been processed by the server and wherein the parsing removes all extraneous information from the audit log, leaving only the actual operations that were processed by the server;
    simulating a multi-user load having concurrent thread activity that the server has previously experienced by feeding an entirety of the operations in the parsed audit log and bind requests generated for the operations to the server and executing the entirety of the operations by the server, wherein concurrent thread activity is simulated by feeding each of the bind requests and each of the operations in the parsed audit log to the server with a separate thread; and
    generating capacity planning statistics for the server environment in response to the feeding.

2. The method of claim 1, wherein the feeding step comprises making a request to the server environment with a separate thread for each of the operations contained in the parsed audit log.

3. The method of claim 1, wherein the generating step comprises:
    retrieving a set of audit logs from the server environment after the feeding step; and
    generating the statistics based on the set of audit logs.

4. The method of claim 1, wherein the statistics comprise at least one statistic selected from the group consisting of a number of operations by Internet Protocol address, a number of operations per hour, response times, a number of search operations, a number of modification operations, a number of addition operations, a number of delete operations and a filter analysis.

5. The method of claim 1, wherein the server environment comprises a plurality of servers.

6. The method of claim 1, wherein the server environment comprises a single server.

7. The method of claim 1, further comprising performing capacity planning using the generated statistics.

8. A system for simulating activity in a Lightweight Directory Access Protocol (LDAP) server environment, comprising:
    at least one computer processor that performs a method, comprising;
    parsing an audit log of a server in the server environment, wherein the audit log contains operations that have been processed by the server and wherein the parsing removes all extraneous information from the audit log, leaving only the actual operations that were processed by the server;
    generating bind requests for the operations and simulating a multi-user load having concurrent thread activity that the server has previously experienced by feeding an entirety of the operations in the parsed audit log and the associated bind requests to the server and executing the entirety of the operations by the server, wherein concurrent thread activity is simulated by feeding each of the bind requests and each of the operations in the parsed audit log to the server with a separate thread; and
    generating capacity planning statistics for the server environment in response to the feeding.

9. The system of claim 8, wherein the method further comprises making a request to the server environment with a separate thread for each of the operations contained in the parsed audit log.

10. The system of claim 8, wherein the method further comprises retrieving a set of audit logs from the server environment after the feeding step, and generates the statistics based on the set of audit logs.

11. The system of claim 8, wherein the statistics comprise at least one statistic selected from the group consisting of a number of operations by Internet Protocol address, a number of operations per hour, response times, a number of search operations, a number of modification operations, a number of addition operations, a number of delete operations and a filter analysis.

12. The system of claim 8, wherein the server environment comprises at least one server.

13. A computer readable storage device having a program product stored thereon for simulating activity in a Lightweight Directory Access Protocol (LDAP) server environment, which when executed, performs a method, comprising:
    parsing an audit log of a server in the server environment, wherein the audit log contains operations that have been processed by the server and wherein the parsing removes all extraneous information from the audit log, leaving only the actual operations that were processed by the server;
    simulating a multi-user load having concurrent thread activity that the server has previously experienced by feeding an entirety of the operations in the parsed audit log and bind requests generated for the operations to the server and executing the entirety of the operations by the server, wherein concurrent thread activity is simulated by feeding each of the bind requests and each of the operations in the parsed audit log to the server with a separate thread; and
    generating capacity planning statistics for the server environment in response to the feeding.

14. The program product of claim 13, wherein feeding makes a request to the server environment with a separate thread for each of the operations contained in the parsed audit log.

15. The program product of claim 13, wherein the generating retrieves a set of audit logs from the server environment after the feeding step, and generates the statistics based on the set of audit logs.

16. The program product of claim 13, wherein the statistics comprise at least one statistic selected from the group consisting of a number of operations by Internet Protocol address, a number of operations per hour, response times, a number of search operations, a number of modification operations, a number of addition operations, a number of delete operations and a filter analysis.

17. The program product of claim 13, wherein the server environment comprises at least one server.

* * * * *